United States Patent
Garratt et al.

(10) Patent No.: US 6,293,354 B1
(45) Date of Patent: Sep. 25, 2001

(54) DISC UNIT

(76) Inventors: Lyle C. Garratt, Box 475; Eldon J. K. Terry, Box 119, both of Milestone, Saskatchewan (CA), S0G 3L0

( * ) Notice: Subject to any disclaimer, the term of this patent is extended or adjusted under 35 U.S.C. 154(b) by 0 days.

(21) Appl. No.: 09/577,816

(22) Filed: May 25, 2000

(51) Int. Cl.[7] .................................................. A01B 49/02
(52) U.S. Cl. ............................ 172/784; 172/662; 172/664
(58) Field of Search .................................... 172/784, 664, 172/668, 613, 662

(56) References Cited

U.S. PATENT DOCUMENTS

| | | |
|---|---|---|
| 879,970 | 2/1908 | Kruse . |
| 2,188,435 | 1/1940 | Hargrave . |
| 2,622,350 | 12/1952 | Arndt . |
| 3,136,078 | 6/1964 | Renault . |
| 4,643,261 | 2/1987 | Long .......................................... 172/2 |
| 5,695,013 | 12/1997 | Waldron .................................. 172/784 |

*Primary Examiner*—Christopher J. Novosad
(74) *Attorney, Agent, or Firm*—Ryan W. Dupuis; Adrian D. Battison; Michael R. Williams

(57) ABSTRACT

There is provided a disc unit for mounting a plurality of discs to an outer end of a mouldboard of a grader. The disc unit includes a mounting bracket for securing to a rear face of an outer end portion of the mouldboard. A frame is pivotally mounted on the mounting bracket and supports an axle which mounts the discs thereon. A hydraulic cylinder pivots the frame supporting the discs in relation to the mounting bracket for raising and lowering the discs to engage the ground at various depths of cut. A cushion valve releases the hydraulic cylinder in the case of an obstruction engaging the discs. The discs include a concave inner surface which are arranged to face towards the grader and partially in the direction of travel for urging particulate material away from the shoulder and towards a center of the road.

18 Claims, 3 Drawing Sheets

＃ DISC UNIT

FIELD OF THE INVENTION

This invention relates to a disc unit for mounting on a mouldboard of a road grader and more particularly to a mouldboard mounted disc unit for recovering scattered gravel from a shoulder of a road for reuse on the road,

BACKGROUND

Often on gravel roads, the gravel is displaced to the sides of the road and collects over time along a shoulder of the road due to the passing of vehicles. This is undesirable as the road loses its covering while the shoulder of the road becomes dangerous to drive on as it is full of loose particles.

Devices have been used in an effort to redistribute gravel evenly across the surface of the road. These do not effectively reclaim the gravel that collects at the shoulder of the road.

U.S. Pat. No. 2,188,435 to Hargrave describes a disking device for use with a grader or other similar vehicle. The disking device comprises a plurality of discs axially aligned and mounted either in front or to the rear of the mouldboard of the grader for levelling and spreading earth and other particulate materials. The device is limited however to being centrally mounted beneath the grader. The device requires manual adjustment of the height of the discs in relation to the grader and manual adjustment of the depth of cut of the discs.

SUMMARY

According to the present invention there is provided a disc unit for collecting scattered particulate material from a shoulder of a road for reuse on the road when mounted on a road grader having a mouldboard extending transversely to a direction of travel of the road grader, the disc unit comprising:

a plurality of substantially parallel spaced apart discs;

a cutting edge about a periphery of each disc arranged to engage the shoulder; and a frame mounting the discs thereon, the frame being arranged to be mounted rearwardly of the mouldboard at an end thereof, each disc being oriented on the frame at an angle extending forward towards and laterally outwards with respect to the mouldboard, the frame being movable between an engaged position wherein the discs engage the shoulder for digging up and urging the particulate material towards the centre Qf the road and a raised position wherein the discs are spaced upwardly from the shoulder such that the discs do not interfere with normal operation of the mouldboard of the grader.

Preferably the discs are mounted axially along a common axis. When the discs are mounted along the common axis, the common axis is preferably arranged at an angle to the rear face of the mouldboard wherein an inner end of the axis is nearer to the rear face of the mouldboard than an outer end of the axis such that the discs mounted along the axis extend at an angle to the rear face of the mouldboard for urging the particulate material towards the centre of the road.

It is preferred that there be provided pivotal mounting means mounting the frame rearwardly of the mouldboard such that the frame is pivotal between the raised position and the engaged position.

When using pivotal mounting means there may be provided hydraulic control means controlling pivotal motion of the frame in relation to the mouldboard such that the discs are positionable at any height relative to the shoulder within a given range. A pressure relief valve may be connected to the hydraulic control means such that pressure within the hydraulic control means is relieved in the event of a sudden blow on the discs from an obstruction on the road.

There may be provided mounting means mounting the frame to the mouldboard wherein the mounting means is arranged such that a height of the discs at an inner end of the frame is adjustable in relation to the height of the discs at an outer end of the frame for levelling the discs on a range of road inclinations.

Preferably each disc includes a concave inner surface facing forwards and towards the centre of the road in use such that the discs are arranged to cut into the shoulder of the road and urge the particulate material towards the centre of the road.

A mounting bracket may be provided mounting the frame on the mouldboard wherein the mounting bracket is arranged to mount on the rear face of the mouldboard.

BRIEF DESCRIPTION OF THE DRAWINGS

In the accompanying drawings, which illustrate an exemplary embodiment of the present invention.

DETAILED DESCRIPTION

Figure 1:
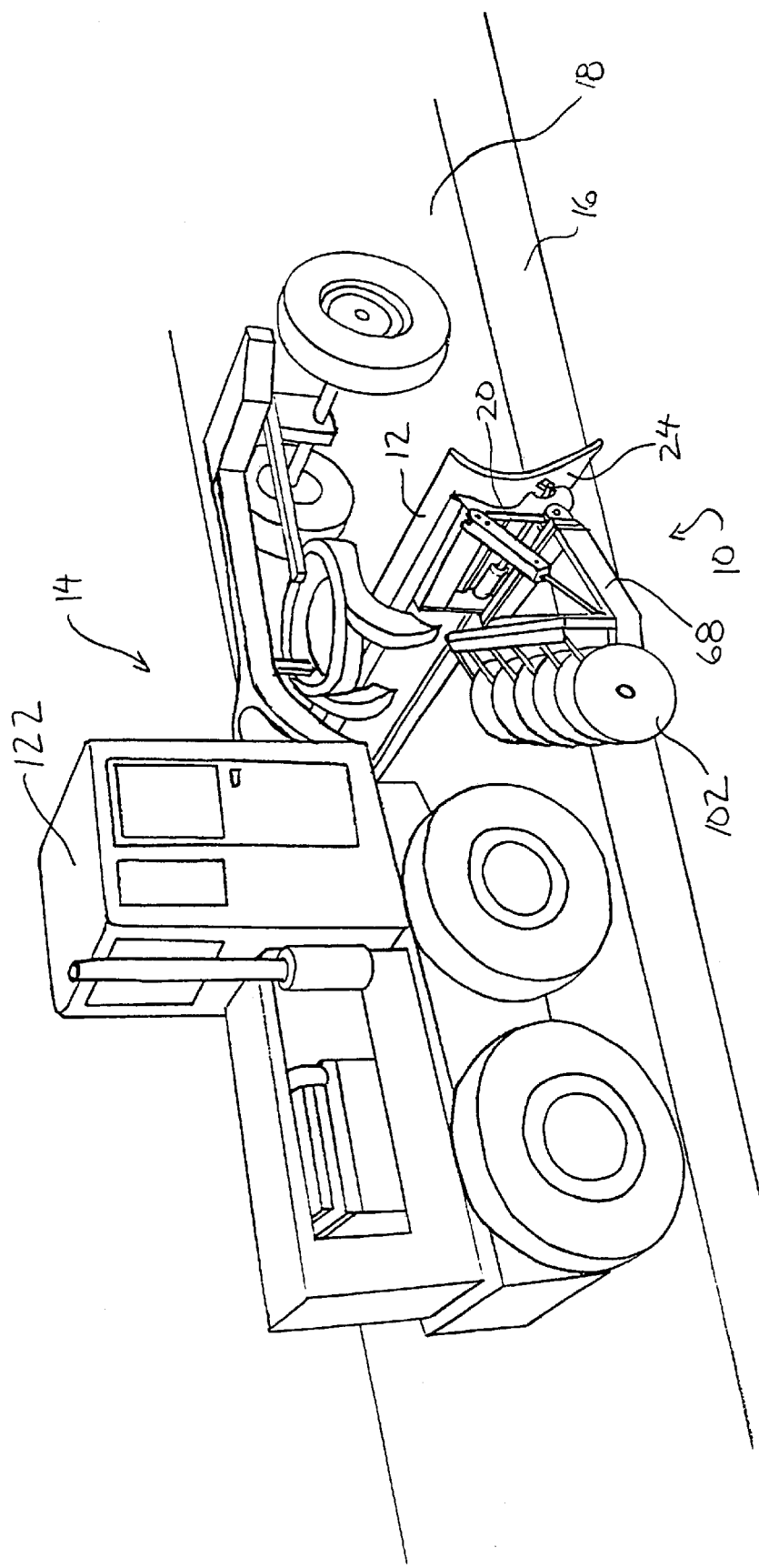
FIG. 1 is an isometric view of the mouldboard mounted disc unit in use mounted on a grader for levelling the shoulder of a road.
Figure 2:
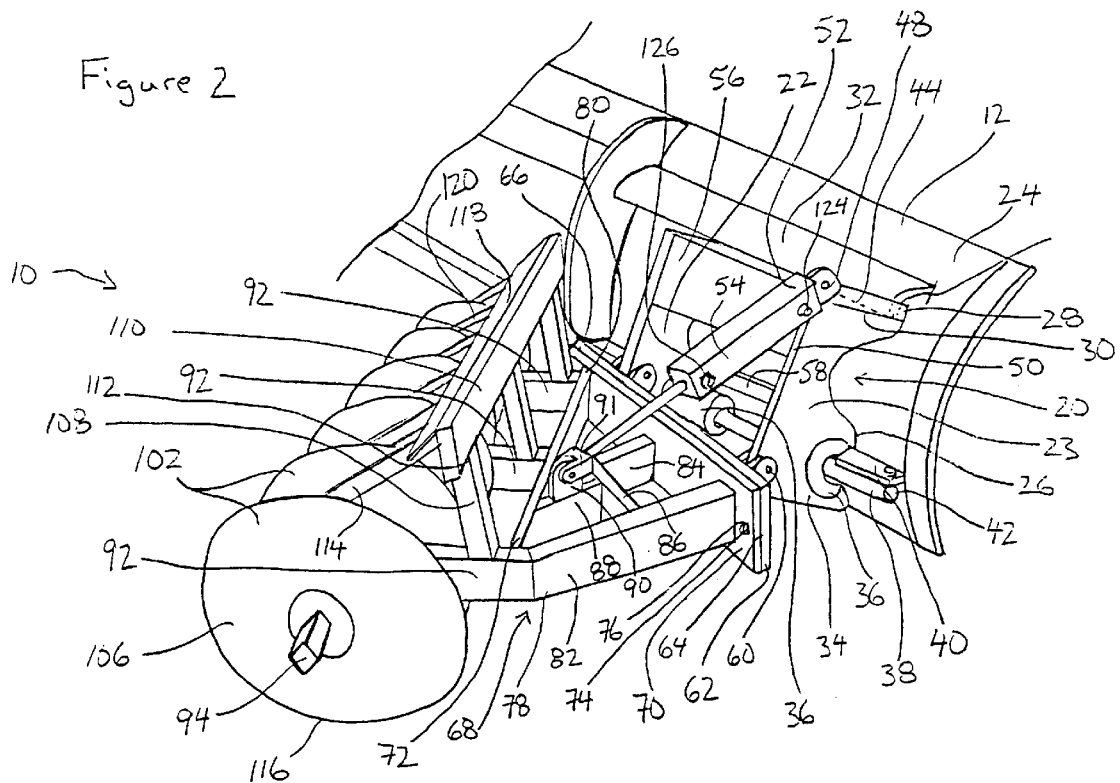
FIG. 2 is an enlarged isometric view of the mouldboard mounted disc unit as shown in FIG. 1.
Figure 3:
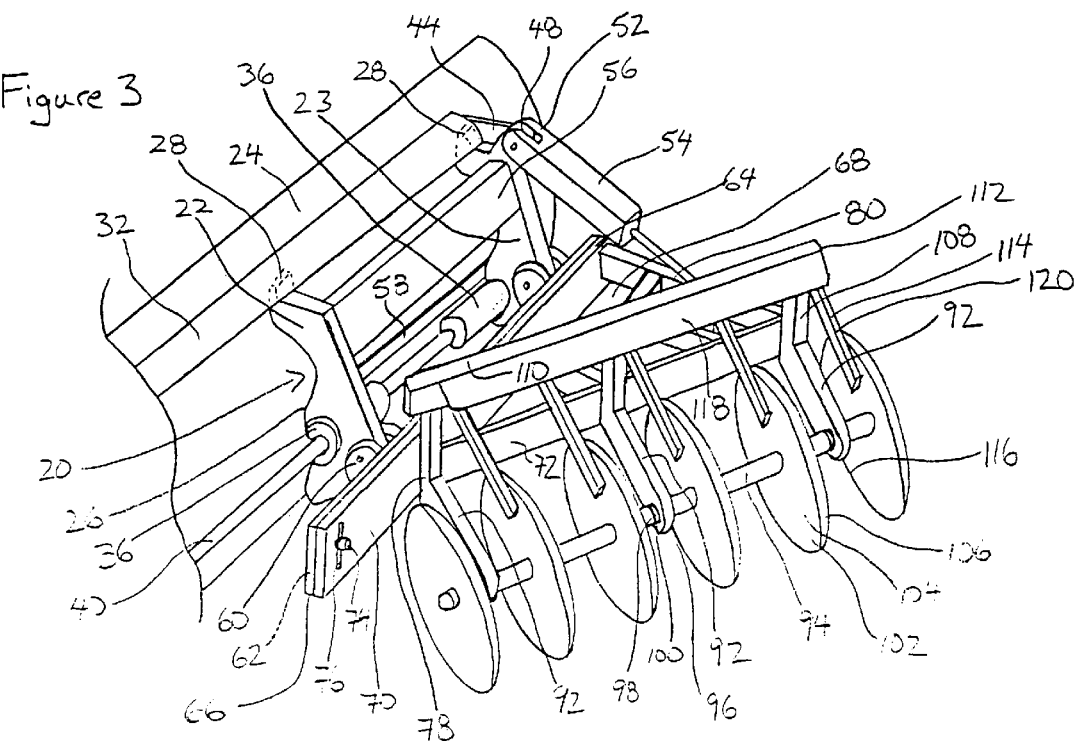
FIG. 3 is an isometric view of the mouldboard mounted disc unit as it is seen from the cabin of the grader.

Referring to the accompanying drawings, there is illustrated a mouldboard mounted disc unit generally indicated by the number 10. The disc unit 10 mounts on a mouldboard 12 of a grader 14 for levelling the shoulder 16 of a road 18.

The disc unit 10 includes a mounting bracket 20 having an inner side member 22 and an outer side member 23 for securing the unit to a rear face 24 of the mouldboard. A front edge 26 of each side member which lies adjacent to the rear face 24 of the mouldboard is arranged to conform to the rear face. The front edge 26 includes an upper flange 28 extending upwards from a top end 30 for engaging beneath a securing flange 32 extending rearwards and downwards from the rear face 24 of the mouldboard. Near a bottom end 34 of each side member, the side member includes a C-shaped sleeve portion 36 extending laterally therefrom and arranged to engage over a supporting rod 38 extending across the rear face of the mouldboard. A lower flange 40 extends laterally from the C-shaped sleeve portion of the outer side member 23 for bolting the bottom end 34 to an end 42 of the supporting rod.

A side flange 44 extends upwards from the top end 30 of the outer side member 23 for engaging an end 46 of the securing flange 32. A lug 48 is mounted on the top end 30 of a rear edge 50 of the outer side member 23. The lug 48 pivotally mounts a cylinder end 52 of a hydraulic cylinder 54.

The inner and outer side members 22 and 23 are connected by a first cross member 56 mounted to each side member at the top end 30 and a second cross member 58 parallel and spaced from the first cross member. The second cross member 46 is mounted to each side member near the bottom end 34.

At the bottom end 34 of the rear edge 50 of both the inner and outer side members is a pivot 60 mounting a respective end of a pivot plate 62. The pivot plate 62 extends laterally outwards past the outer side member 23 at an outer end 64 of the pivot plate and past the inner side member 22 at an inner end 66 of the pivot plate.

A frame 68 mounts onto the pivot plate 62. The frame 68 includes a front member 70 and a rear member 72. The front member 70 is in the form of a plate similar in size and shape to the pivot plate and mounted adjacent to the pivot plate at both ends by a bolt 74 inserted through co-operating apertures 76 in both the pivot plate and the front member. At the outer end 64 of the pivot plate the bolt is fixed within the aperture for pivotal movement of the frame about the bolt at the outer end 64. At the inner end 66 of the pivot plate, the aperture 76 is in the form of a vertical slot for vertically positioning the bolt therein and adjusting an angle between the frame and the pivotal mounting means. Variation of the angle of the frame 68 allows the disc unit to conform to a variety of road inclinations.

The rear member 72 is connected to the front member 70 at an inner end 78 of the frame and spaced from the front member at an outer end 80 of the frame. A first connecting member 82 extends along the outer end 80 for connecting between the front and rear members such that the frame 68 is triangular in shape. A second connecting member 84 extends parallel to the first connecting member from a midpoint of the front member 70 to a midpoint of the rear member 72. A third connecting member 86 extends perpendicularly between the first and second connecting members to provide additional structural support to the frame. An additional connecting member 88 extends between the third connecting member and the rear member for supporting a lug 90 thereon. The lug 90 pivotally connects to a piston end 91 of the hydraulic cylinder 54. In this arrangement, contraction of the hydraulic cylinder will pivot the frame 68 upwards with the pivot plate 62 and expansion of the hydraulic cylinder will pivot the frame 68 downwards with the pivot plate.

Three support members 92 extend perpendicularly from the rear member 72 of the frame for supporting an axle 94 on the support members spaced from and parallel to the rear member 72. The support members are parallel to each other and equally spaced across the rear member. At a rearward end 96 of each support member, a bearing 98 is mounted within an aperture 100 for rotatably mounting the axle 94 therethrough. A plurality of upright discs 102 are axially aligned with the axle 94 and mounted equally spaced along the axle for rotation with the axle. Each disc 102 includes a concave inner surface 104 and a convex outer surface 106 such that each disc forms a scoop.

A column 108 extends upwards from each support member 92 at a position near the rear member. A header bar 110 connects across a top end 112 of the columns 108. A plurality of scraper bars 114 extend rearwards and downwards from the header bar towards respective discs 102. Each scraper bar 114 is a member of rectangular cross section adjacent to the inner surface of the disc at an end portion of the scraper bar. The scraper bars 114 remove excess mud and rocks from the discs in order that a cutting edge 116 along a periphery of the discs remains clear of obstruction. A support flange 118 extends rearwards from the header bar along a top side 120 of the scraper bars for providing additional support to the scraper bars.

In operation, the disc unit is mounted on an outer end 118 of the mouldboard 12 such that the disc unit extends over the shoulder 16 of the road 18 when the grader 14 drives down the road. The mouldboard mounted disc unit is arranged such that it may be viewed entirely from a cabin 122 of the grader such that an operator of the grader can supervise the use of the unit.

The discs 102 of the disc unit are arranged to extend forwards and laterally outwards with respect to the mouldboard and at an angle to a direction of the road such that the inner surface 104 faces forward and inward for cutting into the earth and scooping excess dirt and gravel inwards towards the road. A common axis of the discs extending through the axle 94 remains at a fixed angle to the mouldboard, however the mouldboard is adjustable through a variety of angles such that the angle of the discs in relation to the direction of the road is adjustable.

The horizontal angle of the discs is also adjustable. Repositioning the bolt 74 within the slotted aperture 76 at the inner end 66 of the pivot plate and pivoting the plate about the bolt 74 at the outer end 64 of the plate will adjust the height of the inner end of the frame and the discs mounted thereon in relation to the height of the shoulder and the road. In this manner the angle of the cutting edge 116 of the discs may be adjusted. Adjustment of the bolt 74 within the slotted aperture 76 at the inner end 66 of the pivot plate affects mainly the depth of cut of the discs nearest the inner end 78 of the frame for aligning the discs with the inclination of the road.

The hydraulic cylinder 54 connects at ports 124 and 126 to existing hydraulic lines extending from the grader for controlling contraction and expansion of the hydraulic cylinder using hydraulic controls on the grader. Expansion of the hydraulic cylinder will pivot the frame and discs downwards to engage the shoulder of the road in an engaged position. Contraction of the hydraulic cylinder will pivot the frame and discs upwards such that the discs are spaced from the road and the mouldboard mounted disc unit is in a raised position which will not affect normal operation of the grader. The hydraulic cylinder is adjustable to an unlimited number of depths of cut within a predetermined range of the cylinder. Adjustment of the hydraulic cylinder will primarily adjust the depth of cut of the discs.

Figure 4:
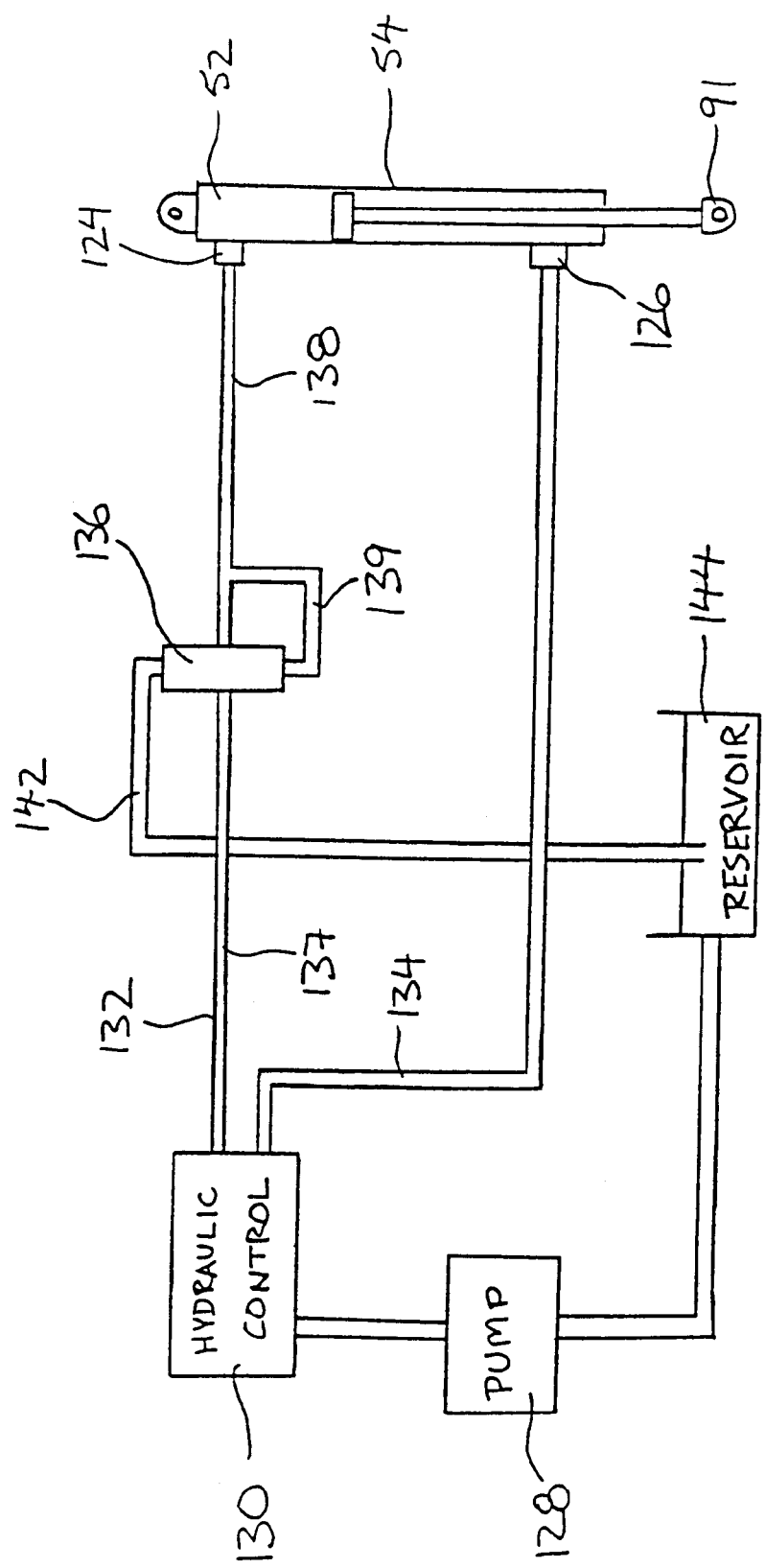
FIG. 4 is a schematic of the hydraulic components of the grader connected with the mouldboard mounted disc unit showing an enlarged pressure relief valve.

The hydraulic system of the road grader is illustrated in FIG. 4. The hydraulic system includes a pump 128 which provides pressurised fluid to a hydraulic control 130. The hydraulic control 130 directs the pressurised fluid to either a first line 132 connected to the cylinder end 52 of the hydraulic cylinder 54 or a second line 134 connected to an opposing end of the cylinder. A pressure relief valve 136 interupts the first line 132 between a first portion 137 and a second portion 138. The valve 136 provides pressure relief to the first line in response to a sudden blow to the disc unit resulting from an obstruction in the road. The pressure relief valve 136 includes a feedback line 139 connected to the second portion 138 and to an end of the valve. The feedback line activates the pressure relief valve 136 when the pressure is suddenly increased in the second portion 138 of the first line. When the valve is activated, the pressurised fluid in the first line 132 is released through a drain line 142 which connects to a reservoir 144. The reservoir 144 is connected to the pump 128. This arrangement will permit the disc unit to recoil upon impact with a rock or other solid object and prevent extensive damage to the unit.

While one embodiment of the present invention has been described in the foregoing, it is to be understood that other embodiments are possible within the scope of the invention. The invention is to be considered limited solely by the scope of the appended claims.

What is claimed is:

1. A disc unit for collecting scattered particulate material from a shoulder of a road for reuse on the road when mounted on a road grader having a souldboard extending transversely to a direction of travel of the road grader, the disc unit comprising:
   a plurality of substantially parallel spaced apart discs;
   a cutting edge about a periphery of each disc arranged to engage the shoulder, and
   a frame mounting the discs thereon, the frame being arranged to be supported entirely on the mouldboard directly on a rear face of the mouldboard and adjacent one end of the mouldboard, each disc being oriented on the frame at an angle extending forward towards and laterally outwards with respect to the mouldboard, the frame being movable between an engaged position wherein the discs are arranged to engage the shoulder for digging up and urging the particulate material towards a centre of the road and a raised position in which the discs are spaced upwardly in relation to the engaged position and wherein the discs are arranged to be spaced upwardly from the shoulder such that the discs do not interfere with normal operation of the mouldboard of the grader.

2. The disc unit according to claim 1 wherein the discs are mounted axially along a common axis.

3. The disc unit according to claim 1 wherein there is provided pivotal mounting means mounting the frame rearwardly of the mouldboard such that the frame is pivotal between the raised position and the engaged position.

4. The disc unit according to claim 3 wherein there is provided hydraulic control means controlling pivotal motion of the frame in relation to the mouldboard such that the discs are positionable at any depth of cut within a given range.

5. The disc unit according to claim 1 wherein each disc includes a concave inner surface facing forwards and towards a centre of the road in use such that the discs are arranged to cut into the shoulder of the road and urge the particulate material towards the centre of the road.

6. The disc unit according to claim 1 wherein the frame is arranged to be supported entirely on the rear face of the mouldboard.

7. A disc unit for collecting scattered particulate material from a shoulder of a road for reuse on the road when mounted on a road grader having a mouldboard extending transversely to a direction of travel of the road grader, the disc unit comprising;
   a plurality of substantially parallel spaced apart discs;
   a cutting edge about a periphery of each disc arranged to engage the shoulder; and
   a frame mounting the discs thereon axially along a common axis, the frame being arranged to be mounted rearwardly of the mouldboard adjacent one end of the mouldboard with each disc being oriented on the frame at an angle eytanding forward towards and laterally outwards with respect to the mouldboard, the frame being movable between an engaged position in which the discs are arranged to engage the shoulder for digging up and urging the particulate material towards a centre of the road and a raised position in which the discs are spaced upwardly in relation to the engaged position so as to be spaced upwardly from the shoulder such that the discs do not interfere with normal operation of the mouldboard of the grader;
   the common axis being arranged at an angle to a rear face of the mouldboard wherein an inner end of the axis is nearer to the rear face of the mouldboard than an outer end of the axis such that the discs mounted along the axis extend at an angle to the rear face of the mouldboard for urging the particulate material towards the centre of the road.

8. The disc unit according to claim 7 wherein there is provided a mounting bracket mounting the frame on the mouldboard, the mounting bracket being arranged to mount on the rear face of the mouldboard.

9. The disc unit according to claim 7 wherein each disc includes a concave inner surface facing forwards and towards the center of the road in use such that the discs are arranged to cut into the shoulder of the road and urge the particulate material towards the center of the road.

10. A disc unit for collecting said scattered particulate material from a shoulder of a road for reuse on the road when mounted on a road grader having a mouldboard extending transversely to a direction of travel of the road grader, the disc unit comprising:
    a plurality of substantially parallel spaced apart discs;
    a cutting edge about a penphery of each disc arranged to engage the shoulder;
    a frame mounting the discs thereon, the frame being arranged to be pivotally mounted rearwardly of the mouldboard adjacent one end of the mouldboard with each disc being oriented on the frame at an angle extending forward towards and laterally outwards with respect to the mouldboard, the frame being pivotal between an engaged position in which the discs are arranged to engage the shoulder for digging up and urging the particulate material towards a centre of the road and a raised position in which the discs are spaced upwardly in relation to the engaged position so as to be spaced upwardly from the shoulder such that the discs do not interfere with normal operation of the mouldboard of the grader;
    a hydraulically controlled actuator controlling pivotal motion of the frame in relation to the mouldboard such that the discs are positionable at any depth of cut within a given range of the actuator, and
    a pressure relief valve connected to the hydraulically controlled actuator such that pressure within the hydraulically controlled actuator is relieved in the event of a sudden blow on the discs from an obstruction on the road.

11. The disc unit according to claim 10 wherein the discs are mounted axially along a common axis.

12. The disc unit according to claim 10 wherein each disc includes a concave inner surface facing forwards and towards the center of the road in use such that the discs are arranged to cut into the shoulder of the road and urge the particulate material towards the center of the road.

13. The disc unit according to claim 10 wherein there is provided a mounting bracket mounting the frame on the mouldboard, the mounting bracket being arranged to mount on a rear face of the mouldboard.

14. A disc unit for collecting scattered particulate material from a shoulder of a road for reuse on the road when mounted on a road grader having a mouldboard extending transversely to a direction of travel of the road grader, the disc unit comprising:
    a plurality of substantially parallel spaced apart discs;
    a cutting edge about a periphery of each disc arranged to engage the shoulder; and a frame mounting the discs thereon, the frame being arranged to be mounted rearwardly of the mouldboard adjacent one end of the mouldboard with each disc being oriented on the frame at an angle extending forward towards and laterally outwards with respect to the mouldboard, the frame being movable between an engaged position in which the discs are arranged to engage the shoulder for digging up and urging the particulate material towards a centre of the road and a raised position in which the discs are spaced upwardly in relation to the engaged position so as to be spaced upwardly from the shoulder such that the discs do not interfere with normal operation of the mouldboard of the grader and the frame being arranged such that a height of the discs at an inner end of the frame is adjustable in relation to the height of the discs at an outer end of the frame for leveling the discs over a range of road inclinations.

15. The disc unit according to claim 14 wherein the discs are mounted axially along a common axis.

16. The disc unit according to claim 14 wherein each disc includes a concave inner surface facing forwards and towards the center of the road in use such that the discs are arranged to cut into the shoulder of the road and urge the particulate material towards the center of the road.

17. The disc unit according to claim 14 wherein there is provided a mounting bracket mounting the frame on the mouldboard, the mounting bracket being arranged to mount on a rear face of the mouldboard.

18. The disc unit according to claim 14 wherein the inner end of the frame includes an upright slot therein arranged to receive a fastener therethrough for securing the inner end of the frame to the mouldboard, the slot being arranged to receive the fastener therein for sliding movement along the slot to adjust the height of the discs at the inner end of the frame in relation to the height of the discs at the outer end of the frame.

* * * * *